UNITED STATES PATENT OFFICE.

OWEN P. WHITMAN, OF LYNN, MASSACHUSETTS.

IMPROVED COMPOSITION FOR GRAINING LEATHER.

Specification forming part of Letters Patent No. 52,920, dated February 27, 1866.

*To all whom it may concern:*

Be it known that I, OWEN P. WHITMAN, of Lynn, in the county of Essex and State of Massachusetts, have invented a new and useful Composition for Graining Leather; and I do hereby declare the same to be fully described, as follows:

The ingredients of such composition and the proportions of each are, extract of logwood, one quart; gum-arabic, one-half an ounce; oxalic acid, one gill; kerosene-oil, one-half a gill; alcohol, one-half a gill.

The extract of logwood is the simple strong infusion of logwood. The several ingredients are to be mixed together, heat being used if desirable to effect a speedy union of them.

The kerosene renders the composition susceptible of taking a better polish than it would have without it when applied to leather and subjected to the hot iron used in polishing it.

The alcohol dissolves the oil or effects its thorough incorporation with the other ingredients.

The mode of using the composition will be understood by those skilled in the art of graining and polishing leather.

I do not limit my invention to the precise proportions as above described of its ingredients, as they may be varied somewhat without materially affecting the result to be attained by it.

While the action of the acid on the extract of logwood affords the requisite color to the mixture, the gum-arabic operates to give body and adhesiveness to it, and is advantageous in other respects.

I claim—

The said composition made of the ingredients and for the purpose substantially as described.

O. P. WHITMAN.

Witnesses:
    F. P. HALE, Jr.,
    G. H. WASHBURN.